United States Patent [19]

Flambard et al.

[11] 4,038,865
[45] Aug. 2, 1977

[54] DEVICE FOR NON-DESTRUCTIVE MEASUREMENT OF A SURFACE LAYER OF A MATERIAL

[75] Inventors: Christian Flambard, Gagny; Alain Lambert, Creil, both of France

[73] Assignee: Centre Technique des Industries Mecaniques, France

[21] Appl. No.: 149,587

[22] Filed: June 3, 1971

[30] Foreign Application Priority Data

June 3, 1970 France .................................. 70.20302
Feb. 11, 1971 France .................................. 71.04558

[51] Int. Cl.² .......................................... G01N 29/00
[52] U.S. Cl. ................................. 73/67.7; 73/71.5 US
[58] Field of Search ............... 73/71.5 U, 67.7, 67.5 R

[56] References Cited

U.S. PATENT DOCUMENTS

| 2,819,613 | 1/1958 | Neiley | 73/67.7 |
| 2,992,553 | 7/1961 | Joy | 73/67.8 S |

FOREIGN PATENT DOCUMENTS

| 766,984 | 1/1957 | United Kingdom | 73/67.7 |
| 200,283 | 3/1968 | U.S.S.R. | 73/67.7 |

OTHER PUBLICATIONS

"Critical Ultrasonic Reflectivity-A Neglected Tool for Material Evaluation" by Rollins from Materials Evaluation, Dec. '66 pp. 683-689.

*Primary Examiner*—James J. Gill

[57] ABSTRACT

This invention relates to a device for non-destructive measurement of the extent to which a surface layer of a material has been affected by a superficial treatment. The device has an emitter of ultrasonic waves and a receiver therefor, the emitter and receiver being movable over the arcuate surface of a semi-cylindrical block which is applied to the material being studied. The emitter and receiver can be moved until the ultrasonic beam is reflected by the surface of the material and measured, means being provided for precise measurement of the angle formed between the emitter and receiver.

10 Claims, 10 Drawing Figures

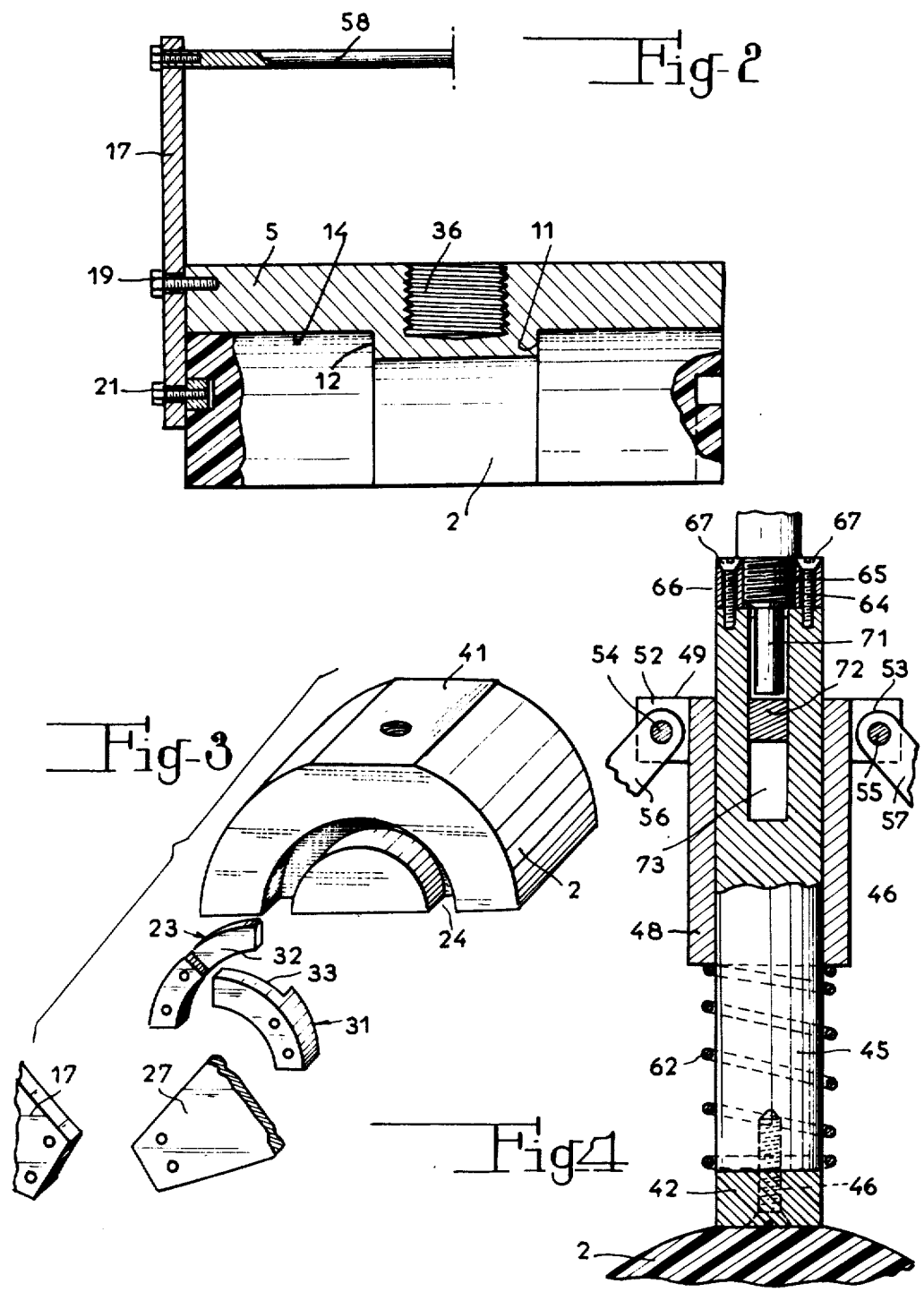

DEVICE FOR NON-DESTRUCTIVE MEASUREMENT OF A SURFACE LAYER OF A MATERIAL

A device for non-destructive measurement of a surface layer of a material.

BACKGROUND OF THE INVENTION

This invention relates to a device for non-destructive measurement of the extent to which a surface layer of a material has been affected by a superficial treatment, and particularly but not exclusively the measurement of the depth to which a material is affected by a thermal and/or theremochemical treatment.

The devices envisaged by the present invention are those which comprise a semi cylindrical block intended to be applied with its non-arcuate face against the sample to be studied, a transducer-emitter of ultrasonic waves, a transducer-receiver, the axes of the emitter and receiver being located in a common plane normal to the axis of the semi cylindrical block, and the emitter and receiver each being carried by a slide which is symmetrically movable on the arcuate surface of said block, means for entrainment of both transducers, and means for measuring the angle which they form between them.

This apparatus is based on a method which includes emitting a beam of ultrasonic waves and appropriately directing the beam so as to produce surface waves on the material to be studied.

Detection and measurement are effected on the beam reflected by the sample surface on which the control operates. This method enables determination on the value of the speed of propagation of the Rayleigh waves on the surface of a solid by measurement of the angle of incidence of the ultrasonic beam causing the production of these surface waves. This theory is particularly developed in the works of G. Bradfield, to which reference will be made for further information, particularly to the article entitled "The ultrasonic goniometer and its applications" in the February issue, 1968, of the periodical "Non-Destructive Testing" and to British Pat. Nos. 959.029 and 772.083.

In the present case, the principle involves taking into account the fact that the speed of propagation of these surface waves is affected by the presence of a layer obtained, particularly on steel, by a thermal treatment, and in particular this variation in speed depends on the value of the thickness of said layer.

A generator delivers the electrical signals necessary to supply the transducer-emitter. The ultrasonic waves may be generated either in the form of short-duration pulses or in wave trains of regulable length; in both cases, various frequencies may be used.

The measurement assembly enables observation and analysis of the signals received by the transducer-receiver. This assembly, made up principally of an oscilloscope, may be accompanied by a recording instrument. In known devices of the type in question, the mechanical connection ensuring symmetrical movements of both transducers comprises a fairly large number of toothed sprockets and pinions, and sliding cardan-jointed shafts, rendering the assembly relatively complicated and liable to have a degree of operational play the elimination of which would make the apparatus even more complex.

One of the objects of the invention is to obviate or mitigate these disadvantages by providing an apparatus of very simple construction, which is robust, convenient to use and reliable and precise in operation.

SUMMARY OF THE INVENTION

According to the present invention there is provided a device for non-destructive measurement of the extent to which a surface layer of a material has been affected by a superficial treatment, particularly for measuring the depth to which a material has been affected by a thermal and/or thermochemical treatment, the device including a block having an arcuate surface and a non-arcuate surface, and being arranged to have its non-arcuate surface engaged with a sample to be studied, an emitter of ultrasonic waves and a receiver therefor, the axes of the emitter and receiver being located in a common plane normal to the axis of the block and the emitter and receiver each being carried by a slide, the slides being symmetrically movable on the arcuate surface of said block, means for measuring the angle which the emitter and receiver form between them, a support provided on the block, and means for moving the two slides comprising an entrainment element movable on the support and connected to the two slides by a system of levers, and a regulation-control element movable on the said support and connected to the entrainment element, the measuring means including means for precisely locating the position of the regulation-control element relative to the said support.

According to the present invention there is also provided a device for non-destructive measurement of the extent to which a surface layer of a material has been affected by a superficial treatment, particularly for measuring the depth to which a material has been affected by a thermal and/or thermochemical treatment, the device including a block having an arcuate surface and a non-arcuate surface, and being arranged to have its non-arcuate surface engaged with a sample to be studied, an emitter of ultrasonic waves and a receiver therefor, the axes of the emitter and receiver being located in a common plane, normal to the axis of the block, and the emitter and receiver each being carried by a slide the slide being symmetrically movable on the arcuate surface of the said block, entrainment means for moving the two slides, and means for measuring the angle which the emitter and receiver form between them, the active end of each of the emitter and receiver passing through the slide on which it is carried, so as to be in contact with the arcuate surface of the block.

Such a structure comprises a very small number of moving parts, and may be constructed practically without play, by relatively simple means.

BRIEF DESCRIPTION OF THE DRAWINGS

An embodiment of the present invention will now be described, by way of example, with reference to the accompanying drawings in which:

FIG. 2 is a partial longitudinal section through part of the device including a transducer-carrying slide;

FIG. 3 is an exploded perspective view of part of the device;

FIG. 4 is a medial section through the upper part of the device as viewed in FIG. 1.

DETAILED DESCRIPTION OF THE INVENTION

Figure 1:
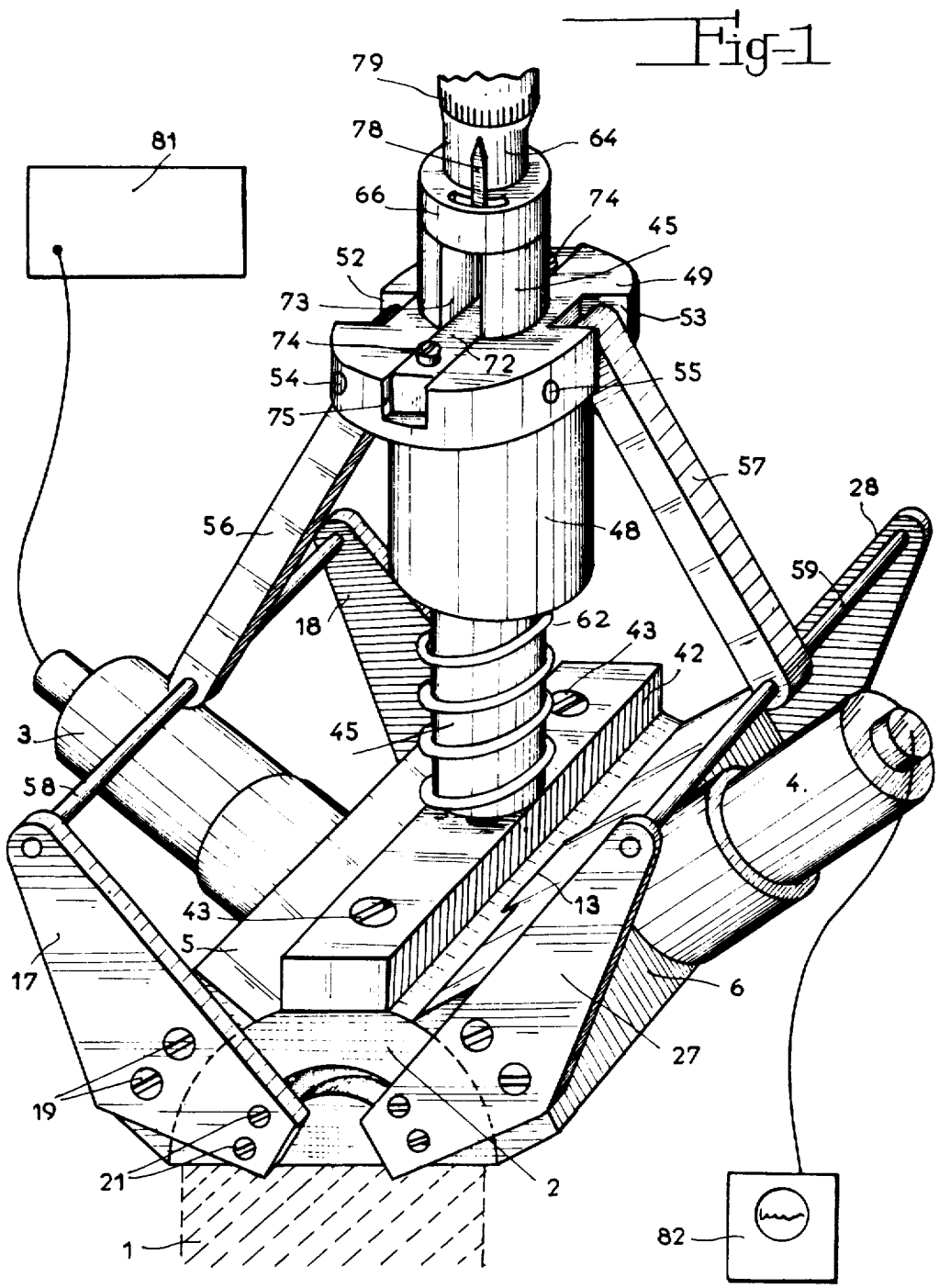
FIG. 1 is a perspective view of a device according to the invention.

The device shown in FIG. 1 is intended for non-destructive measurement of the extent to which a surface layer of a material sample 1 has been affected by a superficial treatment, particularly for measuring the depth to which the material is affected by a thermal and/or thermochemical treatment.

The device substantially comprises a semi-cylindrical block 2 intended to have its non-cylindrical surface engaged with sample 1 to be studied, a transducer-emitter 3 of ultrasonic waves and a transducer receiver 4, the axes of the emitter 3 and receiver 4 being located in a common plane, normal to the axis of the semi-cylindrical block 2. The two transducers 3 and 4 are respectively carried by two slides 5, 6 which are symmetrically movable against the arcuate surface of block 2.

In the example considered the semi-cylindrical block 2 is made of plastic material, preferably methacrylate of methyl. It has a medial annular throat 11 (FIGS. 2 and 5) in which there are engaged lugs 12, 13 of complementary shape forming part, respectively, of the two slides 5 and 6, which have concave faces 14, 15 engaged on the convex arcuate surface of block 2. The lugs 12, 13 of the two slides 5, 6 ensure the axial positioning of the latter. Slides 5, 6 are radially held against block 2, each by a system comprising respectively two jaws 17, 18 and 27, 28 elongate in shape, and extending radially against end faces of the slide on which they are mounted by screws 19. The slides 5, 6 are of the same length as the semi-cylindrical block 2, so that the jaws 17, 18 also bear against the end faces of the block.

Against the internal face of each of the jaws 17, 18 there is secured by screws 21, a stop block 23 (FIG. 3) which in this example, is of arcuate shape and engaged in a semi-circular groove 24 in the corresponding end face of block 2. Against the internal face of jaw 27, there is secured an arcuate stop or block 31 lodged in the groove 24 of the block 2. In order to prevent both blocks 23 and 31 from hindering each other during their movement in groove 24, the blocks are formed at adjacent ends with sections 32, 33 respectively, of half thickness so that the two blocks can overlap one another, with the section 32 of the block 23 located in the base of groove 24, and the section 33 of block 31 located on the section 32 of block 22.

The transducers 3 and 4 are each screwed into a tapped hole 36 (FIGS. 2 and 5) in the respective slides 5, 6.

The slides 5, 6, the jaws 17, 18, 27, 28 and the arcuate blocks 23, 31 are preferably made of metal.

On a flat 41 (see particularly FIG. 3) of the semi-cylindrical block 2, there is fixed a longitudinal plate 42, by means of screws 43 (FIG. 1). Halfway along plate 42 there is fixed a cylindrical support stem 45 (see particularly FIG. 4), by means of two screws 46 arranged on the same diameter so that said stem 45 does not tend to rotate around its axis. On the support stem 45 there is mounted, without play, an entrainment element for the slides, comprising a tubular member 48 fitted with a flange 49 in which there are two diametrally-opposed notches 52, 53 through which there pass screws 54, 55 which serve as axes of articulation at the upper ends of two cranks 56, 57, as viewed in FIG. 1, the lower ends of the cranks 56, 57 being articulated on two stems 58, 59 (FIG. 1).

The stem 58 connects the upper ends of the two jaws 17, 18 integral with the slide 5, while stem 59 connects the corresponding ends of the two jaws 27, 28 integral with the other slide 6.

The member 48 is biased away from plate 42 by a helical compression spring 62 surrounding the stem 45 and supported at one end against plate 42 and at its other end against the member 48. The latter may be brought closer to plate 42 against the force of spring 62 by means of a regulation-control unit including a micrometric stop-screw 64 engaged in a tapped aperture 65 in a ring 66 fixed on the upper end of support stem 45 by means of screws 67. A narrowed end 71 of the screw 66 bears against a crosspiece 72 which can slide in a slot 73 in an upper part of support stem 45, and which is fixed by screws 74, in both ends of a diametral groove 75 provided in flange 49 of socket 48. The crosspiece is movable in a plane normal to that of the median plane of the two notches 52, 53 for articulating the two cranks 56, 57.

The angular position of the regulation-control screw 64 can be regulated precisely by means of a system comprising a fixed index 78, (FIG. 1) provided on the upper side of ring 66, and an annular graduated scale 79 carried on screw 64.

The transducer-emitter 3 is connected to a generator 81, while the transducer-receiver 4 is connected to a measuring assembly comprising an oscilloscope 82 fitted if necessary with a recording device.

In order to measure the thickness of the superficial layer formed on the sample 1, the non-arcuate face of block 2 is applied to said sample, and the angle is sought for which the surface waves are released on the said layer, by turning the control screw 64 in either direction to move the tubular member 48 on the support stem 45 in the required direction, and, in consequence, by means of the lever system comprising cranks 56, 57, the stems 58, 59 and the jaws 17, 18, 17, 18, the slides 5, 6, and the transducers 3, 4. The angular position of the control screw 64 is located on the scale 79 which can be, for example, graduated directly in values for the angle of incidence of the axis of the transducer-emitter 3 relative to the plane of the non-arcuate face of block 2, i.e. half the value of the angle which the two transducers form between them.

In order to effect measurements under the most favorable conditions, a film of oil is interposed between slides 5, 6 and the cylindrical surface of block 2, and oil, or grease, is available in the base of the tapped holes in the slides when the two transducers are fixed thereto.

Figures 6, 7:
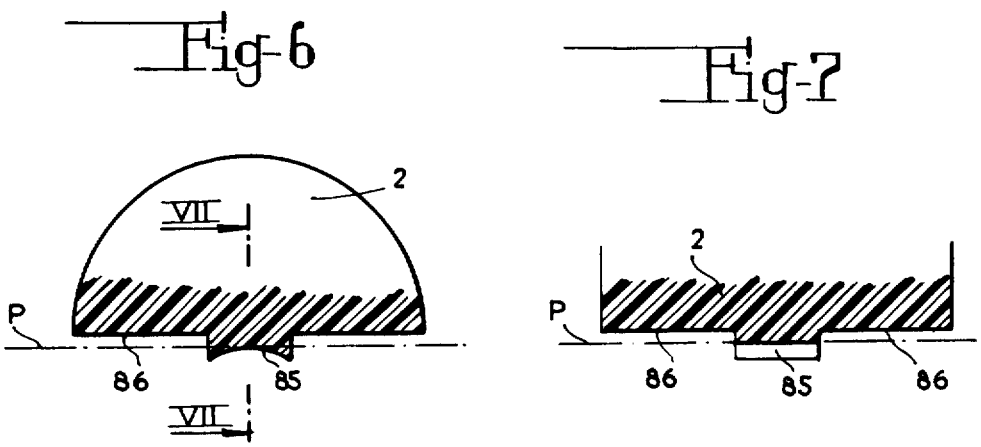
FIG. 6 shows diagrammatically a modification of the semi-cylindrical block of the invention.
FIG. 7 is a section along line VII—VII of FIG. 6.

In order to be able to use the device for measuring the thickness of a layer extending over small surfaces, a certain thickness of the material of the block 2 at the non-arcuate face, apart from a central area, is removed, such that the non-arcuate face 86 (FIGS. 6 and 7) is displaced from the original plane P. As a modification, the outer active face of the central area, or projection, is not flat but recessed to have the shape of a part cylindrical surface 85, the original plane P of the non-arcuate surface of the block 2 being tangential to the surface 85.

Figures 8, 9:
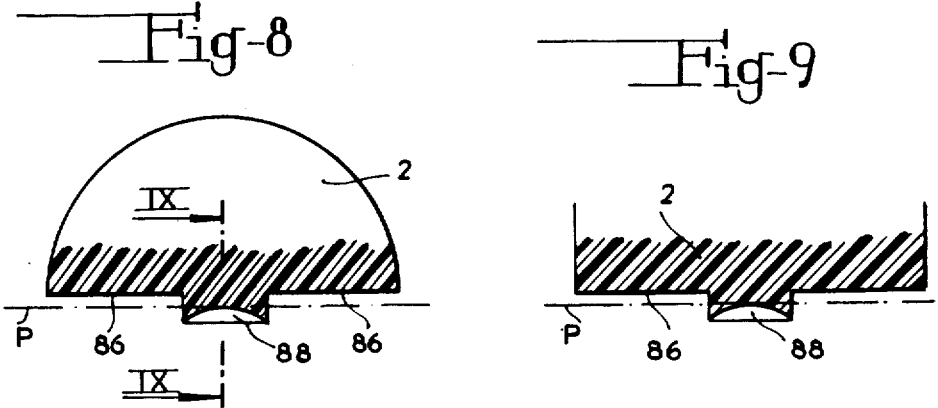
FIG. 8 shows diagrammatically a further modification of the semi-cylindrical block.
FIG. 9 is a section along line IX—IX of FIG. 8.

In another modification, shown in FIGS. 8 and 9, the outer active surface of the central area, or projection, is recessed to have the shape of a part spherical surface 88, the diametral plane P being tangential to the surface 88.

For the study of surfaces which are not perfectly polished, and even those which are more or less rough the non-arcuate surface of the block can be modified (FIG. 5) to have an annular rib 91 on whose edge there is fixed a flexible diaphragm 92 to contain a liquid which completely fills a chamber 93 defined by the annular rib 91 and the block 2. In this case the base of chamber 93 is preferably in the plane P, and the annular rib 91 projects from this plane. Thus the surface of sample 1 can be very conveniently explored.

In the example shown, so that chamber 93 may be always completely full of liquid, there are provided two vertical holes 96, 97 in block 2 opening into the base of chamber 93, these holes also containing liquid, and maintaining the charge in said chamber.

Figure 5:
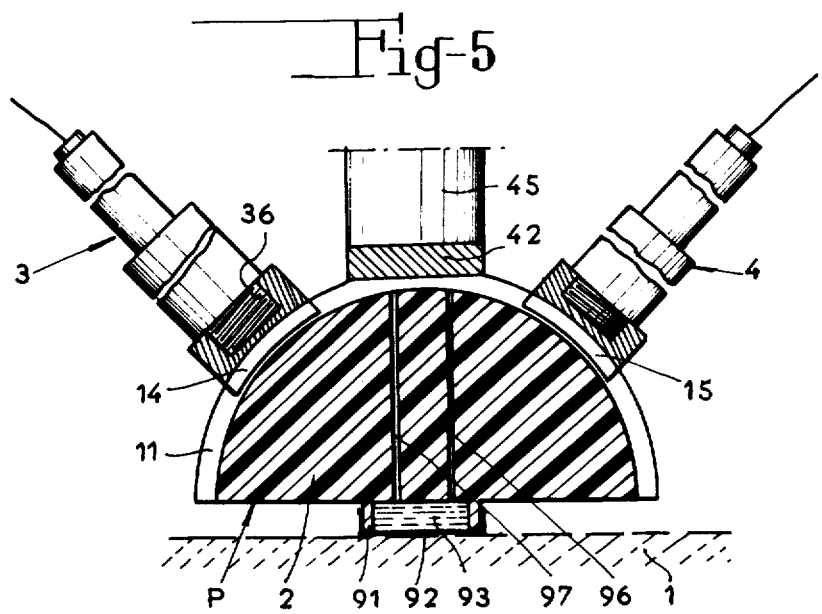
FIG. 5 is a transverse section through the lower part of the device as viewed in FIG. 1.
Figure 10:
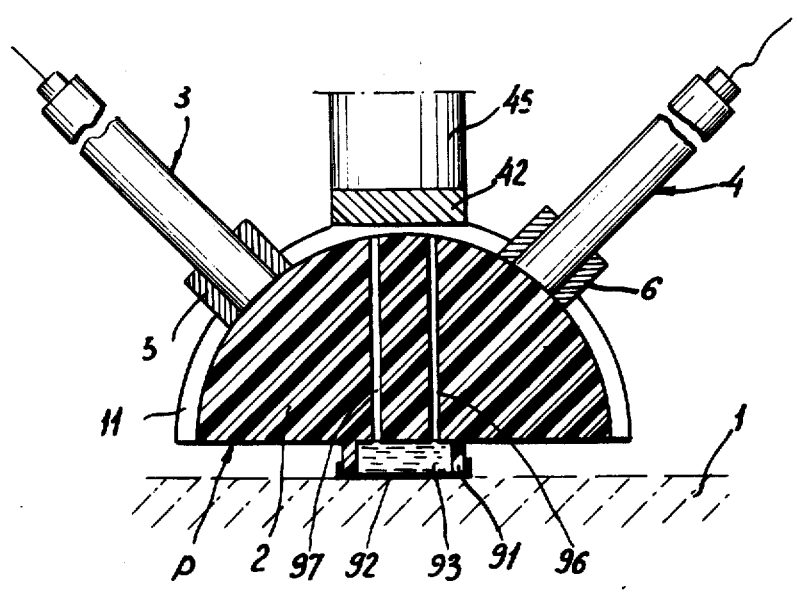
FIG. 10 is a modification of that part of the apparatus shown in FIG. 5.

In the modification shown in FIG. 10, there is provided a cylindrical block 2, similar to that shown in FIG. 5.

The transducer-emitter 3 of ultrasonic waves and the transducer-receiver 4, extend through their respective slides 5, 6 such that the active ends of the transducers are in contact with the arcuate surface of block 2.

This modified device functions in the same way as the previously described device. In order to provide good conditions for measurement, a layer of oil is interposed between the active ends of the two transducers and the arcuate surface of block 2 against which they slide.

In a preferred embodiment, the two slides 5 and 6 are respectively integral with the two transducers 3 and 4 which they carry.

In this particular arrangement, the precision of measurement is improved as the intermediary constituted by the thickness of the slide between the block and the transducers is eliminated along the path of the waves.

We claim:

1. A device for non-destructive measurement of the extent to which a surface layer of a material has been affected by a superficial treatment, particularly for measuring the depth to which a material has been affected by a thermal and/or thermochemical treatment, the device including a block of ultrasonic vibration transmitting material, said block having a convex surface, a non-arcuate surface and an axis, and being arranged to have its non-arcuate surface engaged with a sample to be studied, an emitter of ultrasonic waves and a receiver therefor, each having an axis, the axes of the emitter and receiver being located in a common plane which is normal to the axis of the convex surface of said block, a slide carrying each of the emitter and receiver, the slides being symmetrically movable on the convex surface of said block, measuring means for measuring the angle which the emitter and receiver form between them a support provided on the block and entrainment means for moving the two slides comprising an entrainment element movable on the support and a system of levers connecting the entrainment element to the slides, and a regulation-control element movable on the said support and connected to the entrainment element, the measuring means including locating means for precisely locating the position of the regulation-control element relative to the support.

2. The device according to claim 1, wherein the support is a stem fixed radially to the block, and the entrainment element is a tubular member which is slidably mounted on said stem, and a crank connects the tubular member to each of the emitter and receiver.

3. The device according to claim 1, wherein each transducer-carrying slide has a rib, and an annular groove is provided on the convex surface of the block, said groove having a cross-section complementary to that of the rib, the latter being engaged in the groove to ensure the axial positioning of said slide.

4. A device for non-destructive measurement of the extent to which a surface layer of a material has been affected by a superficial treatment, particularly for measuring the depth to which a material has been affected by a thermal and/or thermochemical treatment, the device including a block of ultrasonic vibration transmitting material, said block having an arcuate surface, a non-arcuate surface, and an axis, and being arranged to have its non-arcuate arcuate surface engaged with a sample to be studied, an emitter of ultrasonic waves and a receiver therefor, each having an axis, the axes of the emitter and receiver being located in a common plane which is normal to the axis of the circuit surface of said block, a slide carrying each of the emitter and receiver, the slides being movable on the arcuate surface of said block, measuring means for measuring the angle which the emitter and the receiver form between them, a support provided on the block, entrainment means for moving the two slides comprising an entrainment element movable on the support and a system of levers connecting the entrainment element to the the slides, and a regulation-control element movable on said support and connected to the entrainment element, the measuring means including locating means for precisely locating the position of the regulation-control element relative to the support, the block having two end faces and the slides each having two end faces and being of the same length as the block, a semi-circular groove provided in each of the two end faces of said block and being coaxial with the arcuate surface of the block, a radial jaw secured to each end face of each slide, and two stops engaged in each groove and mounted on respective radial jaws so as to ensure the radial positioning of the slides.

5. The device according to claim 4, wherein the support is a stem fixed radially to the block, and the entrainment element is a tubular member which is slidably mounted on said stem, and a crank connects the tubular member to each of the emitter and receiver and has two ends, a stem connects the pair of radial jaws mounted on each slide, and each crank is articulated at one end on the tubular member, and at its other end on the respective connecting stem.

6. A device for non-destructive measurement of the extent to which a surface layer of a material has been affected by a superficial treatment, particularly for measuring the depth to which a material has been affected by a thermal and/or thermochemical treatment, the device including a block of ultrasonic vibration transmitting material, said block having an arcuate surface, a non-arcuate surface, and an axis, and being arranged to have its non-arcuate surface engaged with a sample to be studied, an emitter of ultrasonic waves and a receiver therefor, each having an axis, the axes of the emitter and receiver being located in a common plane which is normal to the axis of the arcuate surface of said block, a slide carrying each of the emitter and receiver, the slides being movable on the arcuate surface of said block, measuring means for measuring the angle which the emitter and the receiver form between them, a support provided on the block, entrainment means for moving the two slides comprising an entrainment element movable on the support and a system of levers connecting the entrainment element to the slides, and a regulation-control element movable on said support and connected to the entrainment element, the measuring means including locating means for precisely locating the position of the regulation-control element relative to the support, the support being a stem fixed radially to the block, the entrainment element being a tubular member slidably mounted on said stem, and a crank connecting the tubular member to each of the emitter and receiver, the regulation-control element comprising a screw engaged coaxially in the support stem and a cross piece secured to the tubular member and engaged axially by the screw, with a slot being formed in the support stem and the crosspiece being located in said slot.

7. The device according to claim 6, in which a spring biases the tubular member in a direction away from the block, and one end of the regulation-control screw engages with the crosspiece.

8. A device for non-destructive measurement of the extent to which a surface layer of a material has been affected by a superficial treatment, particularly for measuring the depth to which a material has been affected by a thermal and/or thermochemical treatment, the device including a block of ultrasonic vibration transmitting material, said block having an arcuate surface, a non-arcuate surface and an axis, and being arranged to have its non-arcuate surface engaged with a sample to be studied, an emitter of ultrasonic waves and a receiver therefor, each having an axis, the axes of the emitter and receiver being located in a common plane normal to the axis of the block, a slide carrying each of the emitter and receiver, the slide being symmetrically movable on the arcuate surface of the block, measuring means for measuring the angle which the emitter and receiver form between them, a support provided on the block, and entrainment means for moving the two slides, an annular rib having an outer end, projecting from a central area of the non-arcuate surface of the block, a flexible diaphragm provided to close the outer end of the rib and define a chamber with the rib and the block, and a liquid completely filling the chamber.

9. A device for non-destructive measurement of the extent to which a surface layer of a material has been affected by a superficial treatment, particularly for measuring the depth to which a material has been affected by a thermal and/or thermochemical treatment, this device including a block of ultrasonic vibration transmitting material, said block having a convex surface, a non-arcuate surface, and an axis, and being arranged to have its non-arcuate surface engaged with a sample to be studied, an emitter of ultrasonic waves and a transducer-receiver thereof, each having an active end and an axis, the axes being located in a common plane which is normal to the axis of the block, a slide carrying each of the emitter and receiver, the slides being symmetrically movable on the convex surface of the said block, entrainment means for moving the two slides and measuring means for measuring the angle which the emitter and receiver form between them, the active end of each of the emitter and receiver passing through the slide on which it is carried, so as to be in contact with the arcuate surfact of the block.

10. The device according to claim 9, in which the respective slides are integral with the emitter and receiver.

* * * * *